Figure 1:
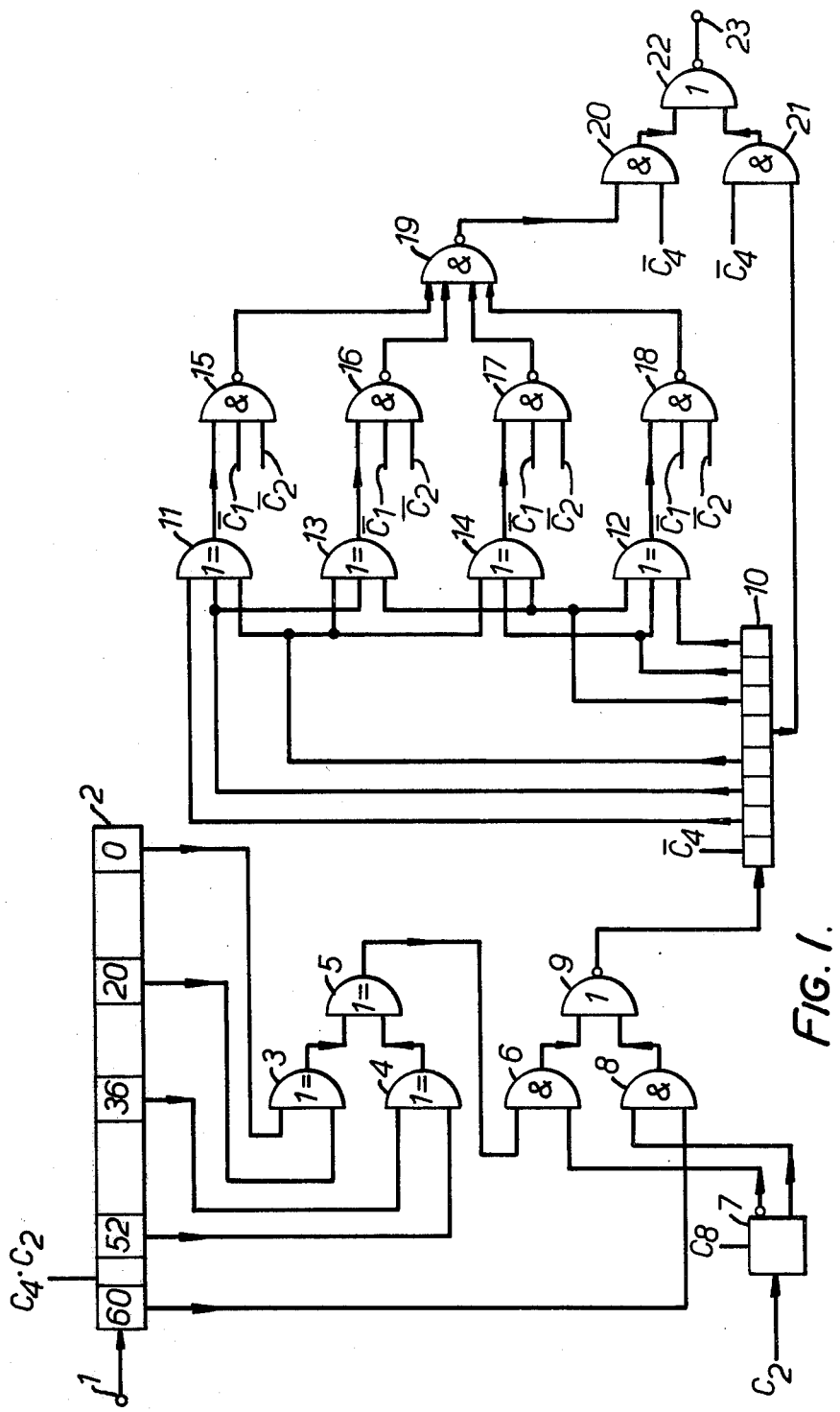

United States Patent [19]

Jonscher

[11] 4,074,228

[45] Feb. 14, 1978

[54] ERROR CORRECTION OF DIGITAL SIGNALS

[75] Inventor: Charles Maria Jonscher, London, England

[73] Assignee: Post Office, London, England

[21] Appl. No.: 735,443

[22] Filed: Oct. 26, 1976

[30] Foreign Application Priority Data

Nov. 3, 1975 United Kingdom .................... 45645/75

[51] Int. Cl.$^2$ ............................................. G06F 11/12
[52] U.S. Cl. ................ 340/146.1 AQ; 340/146.1 AL; 340/146.1 AV
[58] Field of Search ........... 340/146.1 AV, 146.1 AQ, 340/146.1 AL

[56] References Cited

U.S. PATENT DOCUMENTS

| | | | |
|---|---|---|---|
| 3,372,376 | 3/1968 | Helm | 340/146.1 A X |
| 3,418,630 | 12/1968 | Van Duuren | 340/146.1 AL |
| 3,506,961 | 4/1970 | Abramson et al. | 340/146.1 A X |
| 3,668,631 | 6/1972 | Griffith et al. | 340/146.1 A X |
| 3,988,677 | 10/1976 | Fletcher et al. | 340/146.1 AL |

Primary Examiner—Charles E. Atkinson
Attorney, Agent, or Firm—Hall & Houghton

[57] ABSTRACT

Data bits are combined at a transmitter with parity check code bits and convolutional check code bits. On reception the parity check code bits are decoded to determine the error probability in the received signal. The convolutional check code bits are used to correct the received data according to a correction algorithm which is defined in dependence on the error probability revealed by the parity check code bits. The received data is divided into bytes and each byte is given a respective error probability rating. Circuitry including logic gates and shift registers are used to carry out the encoding, decoding and correction operations.

25 Claims, 4 Drawing Figures

ERROR CORRECTION OF DIGITAL SIGNALS

This invention relates to the correction of error in digital signals.

It is well known that error probability in digital transmission increases as signal-to-noise ratio worsens. Since it is not always a practical proposition to reduce noise in the transmission path, ways of dealing with errors in a received signal have had to be developed. There has indeed been intense activity in this field during the past 20 years, a large number of so-called error control codes have been developed which involve the transmission of redundant digits. These digits do not themselves convey information but they make it possible for errors to be controlled at the receiver. The codes can be divided into two categories, namely error detection codes and error correction codes.

Error detection codes are designed to detect whether or not an error has occurred in the transmission of a block of data. If an error is detected, a re-transmission of the whole block is requested.

Error correction codes are designed not only to detect errors but also to correct them. This is known as forward error correction.

The disadvantage of error detection codes is inherent in their nature, that is, the best they can do is enable an error to be detected, they cannot themselves provide any correction.

A disadvantage of many known error correction codes is that they work well only for errors of a particular type for which the particular code is chosen. For example, codes proposed by Bose, Chaudhuri and Hocquenghem give good protection against random (that is, independent) errors, whereas Abramson, Hagelbarger and others have developed codes to provide protection against bursts of errors.

More recently, work has been done on the development of codes that are good for both random and burst errors and it has been proposed to use a single code de-codable in one of two different ways according to whether random or burst errors seem to be appearing.

Nevertheless, in spite of the recent work on error correction codes, it is generally believed that error detection and retransmission is superior to the forward error correction presently available.

It is an object of the invention to provide an improved method of error correction for a digital signal.

The present invention provides a method of error correction for a digital signal, the method comprising:
    receiving a digital signal comprising information bits, first error control bits corresponding to a first error control code, and second error control bits corresponding to a second error control code,
    decoding the first error control bits to determine the probability of error in the received signal,
    decoding the second error control bits, and
    performing a correction algorithm on the information bits using the decoded second error control bits, the algorithm being defined in accordance with the error probability determined from the first error control bits.

The method can include using the first error control bits to correct the second error control bits and information bits prior to performance of the correction algorithm.

The correction for an information bit can be determined by:
    decoding second error control bits by carrying out a predetermined number of tests, each test utilising selected second error control bits and indicating whether or not correction for the particular information bit is required,
    determining a reliability rating for each test using the error probability determined from the first error control bits, and
    using the algorithm to determine from the tests whether or not to correct the particular information bit, the algorithm being determined in accordance with the reliability rating of the tests.

The method can include dividing the signal into bytes, decoding the first error control bits to determine a respective error probability rating for each byte, and determining the reliability rating of a test from the error probability ratings of the bytes in which second error control bits used in the test appear.

The second error control code can be a convolutional check code and the tests can be convolutional code check sums.

The first error control code can be a parity check code.

The error probability rating for a byte can be good, fair or bad, where the rating good is given to an error free byte, the rating fair is given to a byte containing exactly one bit in error, and the rating bad is given to a byte containing two or more bits in error.

The reliability rating for a test can be good, fair or bad, where the rating good is given to a test the second error control bits of which all appear in bytes rated good, the rating fair is given to a test the second error control bits of which all appear in bytes rated good or fair but not all good, and the rating bad is given to all other tests.

The correction algorithm can include determining whether there are more indications that a particular information bit is incorrect than there are that is correct, the tests being selected for use as indications according to their reliability ratings.

The invention also provides an apparatus for correcting error in a digital signal, the apparatus comprising:
    means to receive a digital signal comprising information bits, first error control bits corresponding to a first error control code, and second error control bits corresponding to a second error control code,
    means to decode the first error control bits to determine the probability of error in the received signal,
    means to decode the second error control bits,
    means to perform a correction algorithm on the information bits using the decoded second error control bits and
    means to define the algorithm in accordance with the error probability determined from the first error control bits.

The invention also provides a method of coding a digital signal for error correction on reception, the method comprising selecting information bits to be transmitted and adding to the information bits first error control bits corresponding to a first error control code, and second error control bits corresponding to a second error control code, the first error control code bits being decodable on reception to determine the probability of error in the received signal, and the second error control code bits being decodable on reception so that a correction algorithm can be performed on the information bits using the decoded second error control bits, the algorithm being defined in accordance with the error probability determined from the first error control bits.

The invention can also be embodied in an encoding apparatus arranged to carry out a method of coding as defined in the preceding paragraph.

Figure 2:
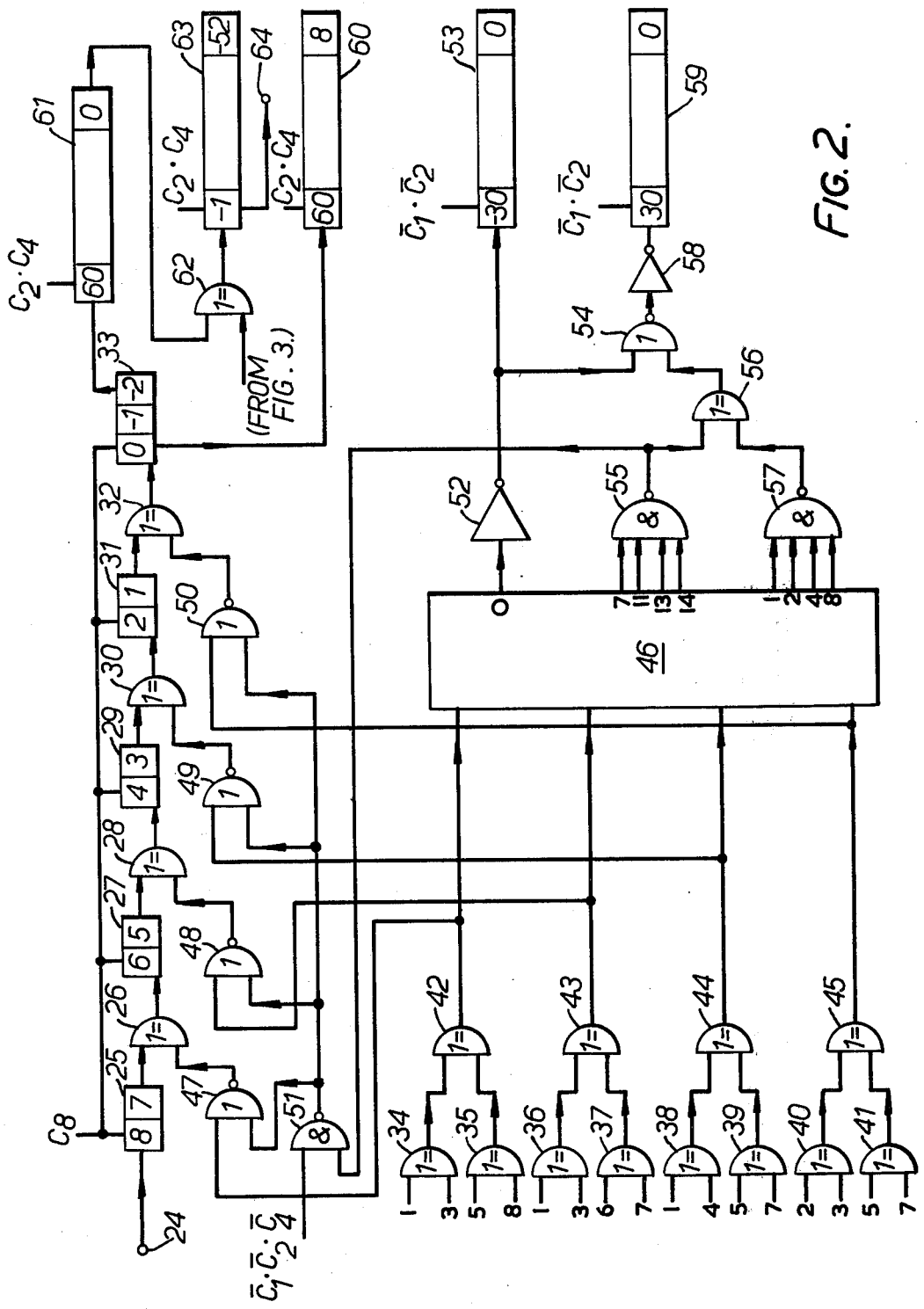
Figure 3:
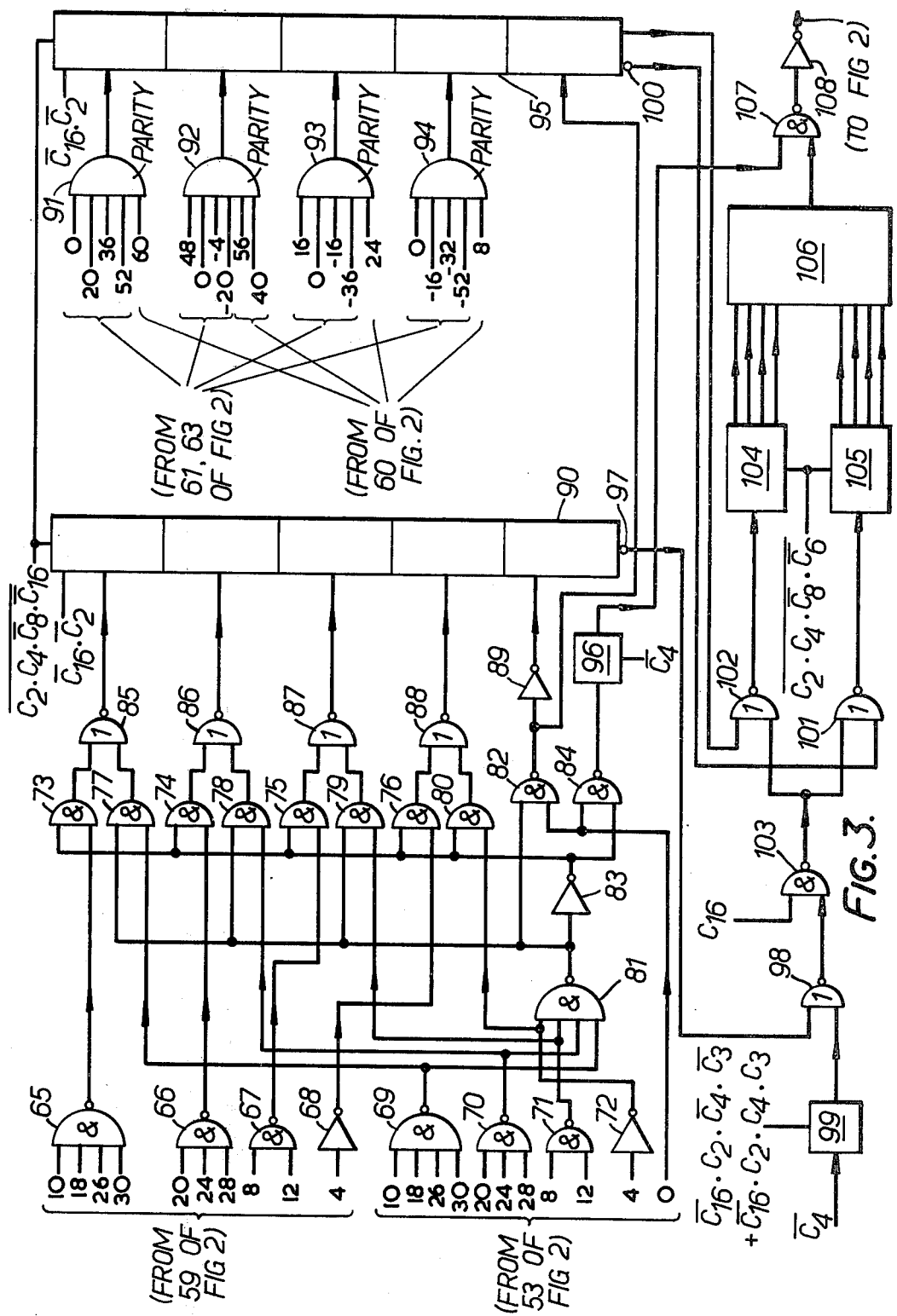

By way of example only, an illustrative embodiment of the invention will now be described with reference to the accompanying drawings, in which:

FIG. 1 is the logic diagram of an encoder in a digital transmission system embodying the invention;

FIGS. 2 and 3 together are the logic diagram of a decoder in the system, and

Figure 4:
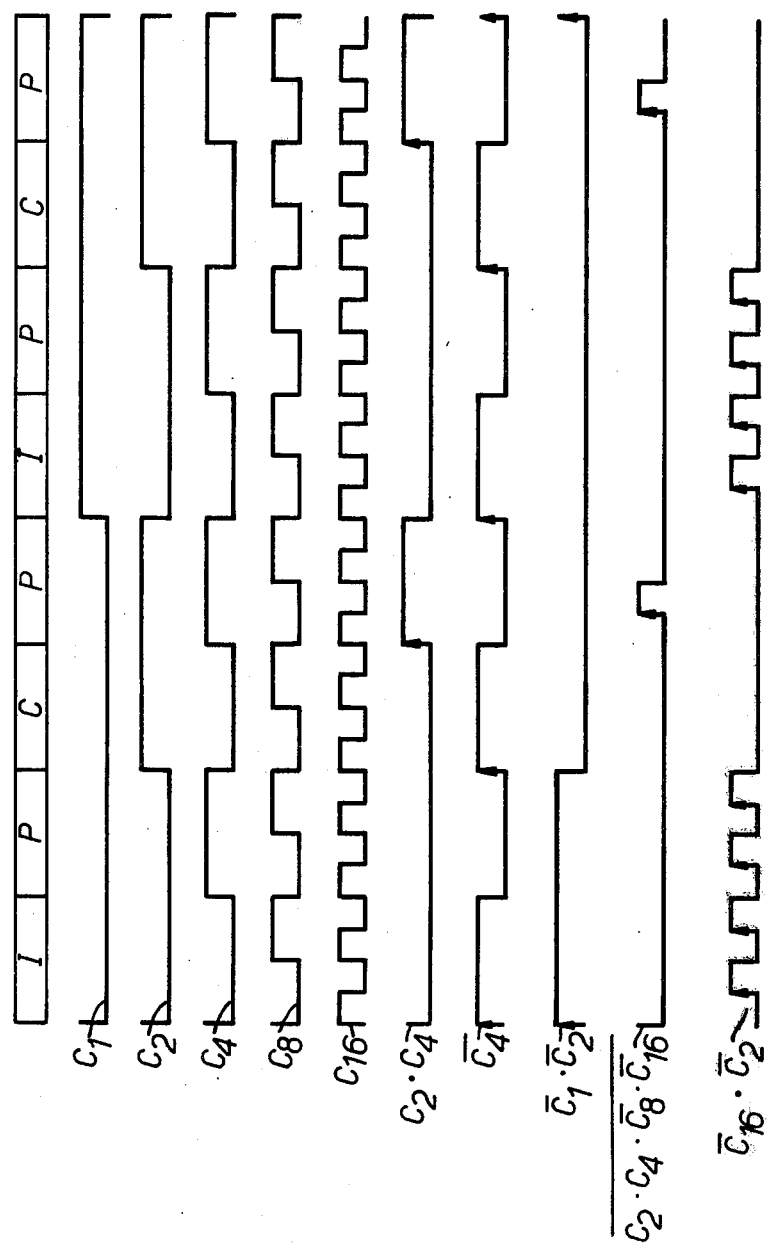

FIG. 4 illustrates timing waveforms for the encoder and decoder.

The encoder and decoder shown in the drawings form part of a pulse code modulation (pcm) digital transmission system, the encoder being employed in a transmitter and the decoder in a receiver of the system. The pcm system transmits data in the form of eight bit bytes and employs 32 channels. One of these 32 channels is reserved for signalling (that is, the channel is used for internal control of the system whereas the other channels are used for external data) and the encoder and decoder shown are concerned with data transmitted in this signalling channel. The circuitry of the pcm system other than that shown is standard and does not therefore need to be described.

By means of the encoder illustrated, six error control bits are transmitted with two signalling information bits in each eight bit byte of the signalling channel. It should be noted that the internal control or signalling of the system is such that this comparatively low rate of data transmission is adequate.

At the receiver, the decoder illustrated carries out error correction by means of the six error control bits in each byte.

The method of coding will now be described.

Let it be supposed that the signalling information to be sent from the transmitter to the receiver consists of a series stream of information bits $I_0, I_1, I_2, I_3 \ldots$ etc.

The first step in the method is to interleave the information bits with check bits using a convolutional check code. Thus, if the check bits are $C_0, C_1, C_2, C_3 \ldots$ etc. the result after interleaving will be:

$I_0, C_0, I_1, C_1, I_2, C_2, I_3, C_3, \ldots$ etc.

A check bit $C_i$ (where $i$ is an integer) is defined as follows:

$$C_i = I_{i+\alpha_1} \oplus I_{i+\alpha_2} \oplus I_{i+\alpha_3} \oplus I_{i+\alpha_4} \oplus \ldots \oplus I_{i+\alpha_n}$$

where the sign $\oplus$ represents modulo 2 addition and $\alpha_1, \alpha_2, \alpha_3, \alpha_4 \ldots \alpha_n$ are a series of integers which define the convolutional check code. It will therefore be seen that each check bit is the modulo 2 sum of a number of information bits appearing at specified positions along the stream.

The second step in the method is to interleave the already inter-leaved stream of information with parity bits $P_0, P_1, P_2, P_3 \ldots$ etc. in accordance with a parity check matrix to produce the following result:

$I_0, P_0, C_0, P_1, I_1, P_2, C_1, P_3$ (an eight bit byte)
$I_2, P_4, C_2, P_5, I_3, P_6, C_3, P_7$ (another eight bit byte) . . . etc.

The convolutional check code is defined as follows:
$n = 4, \alpha_1 = -8, \alpha_2 = -24, \alpha_3 = -40, \alpha_4 = -60$
The parity check matrix is as follows:

| $I_1$ | $P_1$ | $C_1$ | $P_2$ | $I_2$ | $P_3$ | $C_2$ | $P_4$ |
|---|---|---|---|---|---|---|---|
| 0 | 1 | 1 | 0 | 1 | 0 | 1 | 0 |
| 1 | 0 | 0 | 1 | 1 | 0 | 1 | 0 |
| 1 | 0 | 1 | 0 | 0 | 1 | 1 | 0 |
| 1 | 0 | 1 | 0 | 1 | 0 | 0 | 1 |

The parity check matrix defines a range of allowable eight bit bytes. A byte is allowable if (i) the number of 1's in it which are in the same bit position as 1's in the first row of the parity check matrix is even and (ii) the same is true of the second row and (iii) the same is true of the third row and (iv) the same is true of the fourth row, but not otherwise.

The first row of the matrix is to be interpreted as meaning that $P_1$ is determined by $C_1, I_2$ and $C_2$.

The second row is to be interpreted as meaning that $P_2$ is determined by $I_1, I_2$ and $C_2$.

Similarly, the third row means that $P_3$ is determined by $I_1, C_1$ and $C_2$ and the fourth row that $P_4$ is determined by $I_1, C_1$ and $I_2$.

$I_1$ and $I_2$ are, of course, determined by the information to be sent, and $C_1$ and $C_2$ are determined from the information to be sent by means of the convolutional code. Thus, there are three "given" bits from which each parity bit is determined. The rules for choosing the parity bit are:

i. all given bits = 0, $P = 0$
ii. one given bit = 1, two given bits = 0, $P = 1$
iii. two given bits = 1, one given bit = 0, $P = 0$
iv. all given bits = 1, $P = 1$.

All transmitted bytes are, of course, allowable bytes as defined by the parity check matrix but they may become changed before they reach the receiver into non-allowable bytes. The way in which a received non-allowable byte fails the parity test at the receiver enables the receiver (in certain cases) to determine what the byte was before it became modified by error into a non-allowable byte. Parity testing and resultant correction is, of itself, well known in the art.

The circuit of the encoder for carrying out the steps of the coding method will now be described with reference to FIG. 1.

Reference 1 is an input terminal to which the stream of information bits $I_0, I_1, I_2, I_3 \ldots$ etc. is applied. The input terminal 1 is connected to a 61 stage shift register 2 which is clocked by a timing waveform $C_4 \cdot C_2$. If the output end of the shift register is termed stage 0 and the input end stage 60, then outputs are taken from stages 0, 20, 36, 52 and 60. It should, of course, be noted that $52 - 60 = -8 = \alpha_1, 36 - 60 = -24 = \alpha_2, 20 - 60 = -40 = \alpha_3, 0 - 60 = -60 = \alpha_4$.

The outputs from stages 0 and 20 are connected to the inputs of an exclusive OR gate 3.

The outputs of stages 36 and 52 are connected to the input of a further exclusive OR gate 4. The outputs of the gates 3 and 4 are connected to the input of yet another exclusive OR gate 5. The output of the gate 5 is connected to one input of an AND gate 6, the other input of which is connected to the inverted output of a timing element 7 which receives timing waveforms $C_2$ and $C_8$ as inputs. Timing element 7 is set by the waveform $C_2$ and re-set by the waveform $C_8$.

The output of stage 60 is connected to one input of another AND gate 8, the other input of which is connected to the non-inverted output of the timing element 7. The outputs of the AND gates 6 and 8 are connected to the input of an OR gate 9.

Gates 3, 4 and 5 carry out modulo 2 addition on the stage 0, 20, 36 and 52 outputs of the shift register to form the convolutional code check bits.

Gates 6, 8 and 9 act as a switch to interleave the information and the check bits formed by the modulo 2 addition.

The output of gate 9 is connected to the input of an eight stage shift register 10 which is clocked by a timing waveform $C_4$.

An output is taken from each of the second, third and fourth stages of the shift register 10 (numbering the input end as stage one) to a respective input of a three-input exclusive OR gate 11. An output is taken from each of the sixth, seventh and eighth stages of the register 10 to a respective input of another three-input exclusive OR gate 12. A further three-input exclusive OR gate 13 has one input connected to the output of the fourth stage of the register 10, another input connected to the third stage of the register 10, and its third input connected to the sixth stage of the register 10. Yet another three-input exclusive OR gate 14 has one input connected to the output of the fourth stage of the register 10, another input connected to the seventh stage of the register 10, and its third input connected to the sixth stage of register 10.

The output of gate 11 is connected to one input of a three-input NAND gate 15, the other inputs of which are connected to timing waveforms $\overline{C_1}$ and $\overline{C_2}$ respectively.

The output of gate 13 is connected to one input of another three-input NAND gate 16, the other inputs of which are connected to timing waveforms $\overline{C_1}$ and $C_2$ respectively.

The output of gate 14 is connected to one input of another three-input NAND gate 17, the other inputs of which are connected to timing waveforms $C_1$ and $\overline{C_2}$ respectively.

The output of gate 12 is connected to one input of another three-input NAND gate 18, the other inputs of which are connected to timing waveforms $C_1$ and $C_2$ respectively.

The outputs of the gates 15, 16, 17 and 18 are each connected to a respective input of a four-input NAND gate 19.

The output of NAND gate 19 is connected to one input of a two-input AND gate 20, the other input of which is connected to a timing waveform $C_4$.

The output of the fifth stage of the register 10 is connected to one input of a two-input AND gate 21, the other input of which is connected to a timing waveform $\overline{C_4}$.

The outputs of gates 20, 21 are each connected to a respective input of an OR gate 22.

The coded output is taken from a terminal 23 connected to the output of the gate 22.

Register 10 is filled with the interleaved stream of information and convolutional code check bits. Gates 11, 12, 13 and 14 generate the parity check bits from the contents of the register 10 to satisfy the requirements of the parity check matrix. Gates 15, 16, 17, 18, 19, 20, 21 and 22 accomplish the interleaving of the parity check bits with the information and convolutional check bits.

A desirable modification of the circuit shown is to invert all the parity check bits before transmission. This is of benefit in providing protection against those bursts of errors which change the signal into a stream of all 0's or all 1's. If the parity check bits are inverted it is, of course, necessary to invert them again on reception.

The method of decoding at the receiver will now be discussed.

The first step in decoding is to carry out a parity check using the parity check bits in the incoming data. This check detects the presence of any errors in a byte except the following errors: all eight bits in error and fourteen particular combinations of four bits in error. The check not only detects the presence of all single bit errors but also enables them to be corrected. However, the following combinations of errors will result in erroneous correction at this stage: any combination of three bits in error, any combination of five bits in error, and any combination of seven bits in error. In view of the possibilities of erroneous correction any byte for which an attempt at single bit error correction has been made at this stage will, in subsequent processing, be considered less reliable than a byte for which no such attempt has been made.

Assuming that the parity check has been carried out and the error or errors in a byte detected and any single bit errors corrected, the byte is now accorded an "error rating" as follows:

G — good, there were no errors in the byte
F — fair, there was one bit only in error in the byte
B — bad, there were two or more bits in error in the byte.

The next step is to carry out check sums in accordance with the convolutional check code. It will be remembered that coding was defined by $n = 4$, $\alpha = -8$, $\alpha_2 = -24$, $\alpha_3 = -40$, $\alpha_4 = -60$ which is satisfied by:

$$C_8 = I_0 \oplus I_{-16} \oplus I_{-32} \oplus I_{-52}$$

$$C_{24} = I_{16} \oplus I_0 \oplus I_{-16} \oplus I_{-36}$$

$$C_{40} = I_{32} \oplus I_{16} \oplus I_0 \oplus I_{-20}$$

$$C_{56} = I_{48} \oplus I_{32} \oplus I_{16} \oplus I_{-4}$$

$$C_{60} = I_{52} \oplus I_{36} \oplus I_{20} \oplus I_0.$$

Using primed symbols to denote received information, check sums $S_8$, $S_{24}$, $S_{40} \oplus S_{56}$ and $S_{60}$ are formed as follows:

$$S_8 = C_8' \oplus I_0' \oplus I_{-16}' \oplus I_{-32}' \oplus I_{-52}'$$

$$S_{24} = C_{24}' \oplus I_{16}' \oplus I_0' \oplus I_{-16}' \oplus I_{-36}'$$

$$S_{40} \oplus S_{56} = C_{40}' \oplus C_{56}' \oplus I_{48}' \oplus I_0' \oplus I_{-4}'$$

$$S_{60} = C_{60}' \oplus I_{52}' \oplus I_{36}' \oplus I_{20}' \oplus I_0'$$

Each of check sums $S_8$, $S_{24}$, $S_{40} \oplus S_{56}$, $S_{60}$ should (if the received bits are error free) be equal to zero. A decoding algorithm is next performed to compute the value of $I_0$ most likely to be correct.

Each check sum is given its own reliability rating as follows:

G — good, ignoring $I_0'$, all bits involved in the formulation of the check sum appear in bytes rated G by the parity test
F — fair, ignoring $I_0'$, all bits involved in the formulation of the check sum appear in bytes rated F or G by the parity test, not all the bytes being rated G
B — bad, all other cases.

The decision whether or not to correct $I_0'$ is taken on a basis of the number of checks $r$ (an integer) indicating $I_0'$ to be correct and the number $s$ (an integer) which indicate it to be incorrect. A check sum is considered successful if its value equals zero, and unsuccessful if its value equals one. The integers $r$ and $s$ are determined as follows and it should be noted that the parity check influences the values of $r$ and $s$ because it is from the parity check that the check sum reliability ratings are determined:

i. if one or more check sums is rated G, $r$ = number of successful check sums of rating G, if the byte containing $I_0'$ has the rating F or B, or $r$ = (number of successful check sums of rating G) plus one, if the byte containing $I_0'$ has the rating G, $s$ = number of failed check sums of rating G ii. if no check sum is rated G $r$ = number of successful check sums of rating F, $s$ = number of failed check sums of rating F.

Once $r$ and $s$ have been so determined a decision is taken whether to read $I_0'$ as correct or whether to correct it by inversion. This decision is taken as follows:

if $r > s$, $I_0'$ is taken as correct if $r = s$, $I_0'$ is taken as correct if $r < s$, $I_0'$ is deemed to need correction unless there is no check sum of rating G *and* $I_0'$ byte has the rating G.

The data undergoing correction is then stepped onwards so that what was $I_0'$ under test now becomes a bit appropriately corrected and what was $I_1'$ becomes the new bit under test.

The circuit of the decoder for carrying out the steps of the decoding method will now be described with reference to FIGS. 2 and 3.

Reference 24 is a terminal by which the data stream to be decoded enters the decoder. Terminal 24 is connected to the first stage of a two-stage register element 25 which is clocked by a timing waveform $C_8$. The second stage of the element 25 is connected to one input of an exclusive OR gate 26, the output of which is connected to the first stage of another shift register element 27, also clocked by the timing waveform $C_8$. The second stage of element 27 is connected to one input of another exclusive OR gate 28, the output of which is connected to the first stage of another shift register element 29, also clocked by the timing waveform $C_8$. The second stage of the element 29 is connected to one input of another exclusive OR gate 30, the output of which is connected to the first stage of another shift register element 31, also clocked by the timing waveform $C_8$. The second stage of the element 31 is connected to one input of another exclusive OR gate 32, the output of which is connected to the first stage of a three-stage shift register element 33, also clocked by the timing waveform $C_8$.

The elements 25, 27, 29, 31 and 33 define an 11-stage shift register of which the input end is marked '8' and the output end is marked '−2'. This system of referencing is intended to assist in understanding the movement of data through the circuit.

Eight exclusive OR gates 34 to 41 inclusive have their inputs each connected to a respective one of the stages of the 11-stage shift register. The numbers at the inputs indicate the stages to which they are connected.

The outputs of gates 34 and 35 are connected to the input of an exclusive OR gate. In a like manner, gates 36 and 37, 38 and 39, 40 and 41 are connected respectively to exclusive OR gates 43, 44 and 45.

The outputs of the gates 42, 43, 44 and 45 are taken to respective inputs of a four-line to 16-line decoder 46.

The output of gate 42 is also connected to one input of a NOR gate 47, the output of which is connected to the second input of gate 26. Similarly, NOR gates 48, 49 and 50 are connected between gates 43 and 28, 44 and 30, 45 and 32 respectively. The other inputs of gates 47, 48, 49 and 50 are commonly connected to the output of a NAND gate 51. One input of the NAND gate 51 is supplied with a timing waveform $\overline{C_1} \cdot \overline{C_2} \cdot \overline{C_4}$.

The decoder 46 has sixteen output lines but only the '0', '1', '2', '4', '7', '8', '11', '13' and '14' lines are used. The output of each line of the decoder is normally logical '1' but falls to '0' if that line is addressed. For example, the input 0110 (seven in binary notation) causes the output on line '7' to drop to '0'. It should be noted that the most significant digit on the input lines to the decoder is applied to the topmost line.

The "0" output line is connected to the input of an inverter 52, the output of which is connected to the first stage of a 31 stage shift register 53 clocked by a timing waveform $\overline{C_1} \cdot \overline{C_2}$. The "0" output line is also connected to one input of a NOR gate 54.

The "7", "11", "13" and "14" output lines are connected to respective inputs of a four-input NAND gate 55, the output of which is connected to one input of an exclusive OR gate 56 and also to the second input of NAND gate 51.

The "1", "2", "4" and "8" output lines are connected to respective inputs of a four-input NAND gate 57, the output of which is connected to the other input of the exclusive OR gate 56.

The output of OR gate 54 is connected to the input of an inverter 58, the output of which is connected to the input of a thirty-one stage shift register 59, clocked by a timing waveform $\overline{C_1} \cdot \overline{C_2}$.

The stage of element 33 marked "0" is connected to the input of a 53 stage shift register 60, clocked by a timing waveform $C_2 \cdot C_4$.

The stage of element 33 marked "−2" is connected to the input of a 61 stage shift register 61, clocked by the timing waveform $C_2 \cdot C_4$. The end of register 61 is connected to one input of an exclusive OR gate 62, the other input of which is connected to an output in FIG. 3 to be described later.

The output of exclusive OR gate 62 is connected to the input of a 52 stage shift register 63, clocked by the timing waveform $C_2 \cdot C_4$. The first stage of register 63 being connected to an output terminal 64.

The circuit of the decoder is continued in FIG. 3.

A four-input NAND gate 65, a three-input NAND gate 66, a two-input NAND gate 67 and an inverter 68 each have their inputs connected to respective stages of the register 59. The connections are indicated by numbers representing stages of the register from "30" (input end) to "0".

A four-input NAND gate 69, a three-input NAND gate 70, a two-input NAND gate 71 and an inverter 72 each have their inputs connected to respective stages of the register 53. The connections are indicated by numbers representing stages of the register from "30" (input end) to "0".

The outputs of gates 65, 66, 67 and inverter 68 are connected respectively to one input of each of four AND gates 73, 74, 75 and 76.

The outputs of gates 69, 70, 71 and inverter 72 are connected respectively to one input of each of four AND gates 77, 78, 79 and 80.

A four-input NAND gate 81 has one input respectively connected to each of the outputs of gates 69, 70, 71 and inverter 72. The output of NAND gate 81 is commonly connected to the other inputs of AND gates 77, 78, 79 and 80.

A NAND gate 82 has one input connected to the output of NAND gate 81 and the other connected to stage "0" (the end) of register 53.

The output of NAND gate 81 is connected to an inverter 83, the output of which is connected to one input of a further NAND gate 84. The other input of NAND gate 84 is connected to stage "0" of register 53.

The outputs of gates 73 and 77, 74 and 78, 75 and 79, 76 and 80 are connected to respective inputs of NOR gates 85, 86, 87 and 88.

The output of gate 82 is connected to the input of an inverter 89.

A five-stage parallel-input serial-output shift register 90 has its first input connected to the output of gate 85, its second to the output of gate 86, its third to the output of gate 87, its fourth to the output of gate 88, and its fifth to the output of inverter 89. It is loaded under control of a timing waveform $\overline{C_2 \cdot C_4 \cdot \overline{C_8} \cdot \overline{C_{16}}}$ and clocked by a timing waveform $\overline{C_{16}} \cdot \overline{C_2}$.

Four five-input parity check gates 91, 92, 93, 94 have their inputs connected to stages of the shift registers 60, 61 and 63. The connections are indicated by numbers as previously. It should be noted that register 60 is numbered "60" (input end) to "8", register 61 is numbered "60" (input end) to "0", and register 63 is numbered "−1" (input end) to "−52".

A further five-stage parallel-input serial-output shift register 95 has its first input connected to the output of gate 91, its second to the output of gate 92, its third to the output of gate 93, its fourth to the output of gate 94, and its fifth to the output of gate 82. It is loaded under control of the timing waveform $\overline{C_2 \cdot C_4 \cdot \overline{C_8} \cdot \overline{C_{16}}}$ and clocked by the timing waveform $\overline{C_{16}} \cdot \overline{C_2}$.

A bistable element 96 is set by the output of gate 84 and reset by a timing waveform $\overline{C_4}$.

An inverter 97 inverts the output of register 90 and applies the inverter output to one input of a NOR gate 98. A timing element 99 is set by the timing waveform $\overline{C_4}$ and reset by a timing waveform $\overline{C_{16}} \cdot C_2 \cdot \overline{C_4} \cdot \overline{C_3} + \overline{C_{16}} \cdot C_2 \cdot C_4 \cdot C_3$. The output of the timing element 99 is connected to the other input of the NOR gate 98.

An inverter 100 inverts the output of register 95 and applies the inverted output to one input of a NOR gate 101. The uninverted output of register 95 is connected to one input of another NOR gate 102. The other inputs of gates 101 and 102 are commonly connected to the output of a NOR gate 103. NOR gate 103 receives as inputs a timing waveform $C_{16}$ and the output of gate 98.

The output of gate 102 is connected to the input of a counter 104 and that of gate 101 to the input of a counter 105. Both counters are periodically cleared by a timing waveform $C_2 \cdot C_4 \cdot \overline{C_8} \cdot \overline{C_{16}}$ and the output of each counter is in four-line parallel form.

The outputs of the counters 104, 105 are connected to a magnitude comparator 106 which compares the magnitude of the count in one counter with that in the other.

The output of magnitude comparator 106 is connected to one input of a NAND gate 107, the other input of which is connected to the output of timing element 96. The output of gate 107 is connected by means of an inverter 108 to the second input of gate 62.

FIG. 4 illustrates some of the timing waveforms and their relationship to the timing of the data signal ($I =$ information bit, $P =$ parity check bit, $C =$ convolutional code bit). A clock waveform $C_1$ has a period one half that of the eight digit byte, $C_2$ has a period one half that of $C_1$, $C_4$ half that of $C_2$, $C_8$ half that of $C_4$, and $C_{16}$ half that of $C_8$. Most of the timing waveforms are logical combinations of various ones of the clock waveforms, for example the logical combination $C_2$ AND $C_4$ ($C_2 \cdot C_4$) and various others are illustrated. Switching takes place on the positive going transitions and this is illustrated by the use of arrowheads. In other cases the timing waveforms are the simple clock waveforms themselves and are not produced by logical combination. FIG. 4 illustrates sufficient for all the timing waveforms used to be determined.

The operation of the decoder will now be briefly described. The elements 25, 27, 29 and 31 receive the incoming byte to be decoded and the gates 34 to 45 inclusive perform parity checks on the byte. The gates 34, 35 and 42, perform a parity check involving the bit $P_4$. It will be remembered that $P_4$ was chosen on transmission in terms of $I_1$, $C_1$ and $I_2$. The gates 34, 35 and 42 determine whether or not $P_4$ as received ($P_4'$) satisfies the rules given earlier in relation to $I_1$, $C_1$ and $I_2$ as received ($I_1'$, $C_1'$, $I_2'$). The reader will be able to verify that if the rules are satisfied then the output of gate 45 is 0 but if the rules are not satisfied then the output of gate 45 is 1.

Similarly, gates 38, 39 and 44 check $P_3$ as received ($P_3'$) in terms of $I_1$, $C_1$ and $C_2$ as received ($I_1'$, $C_1'$, $C_2'$).

Gates 36, 37 and 43 check $P_2'$ in terms of $I_1'$, $I_2'$ and $C_2'$ and gates 34, 35 and 42 check $P_1'$ in terms of $C_1'$ $I_2'$ and $C_2'$.

If all four parity check bits as received are correct in relation to the information and convolutional code bits as received then the input to the decoder 46 will be 0000 and it will produce a 0 on its "0" output line and 1 on all the remaining lines.

If three out of four parity check bits are correct then the input to the decoder 46 will be 1000 ($P_4'$ parity check failed), 0100 ($P_3'$ parity check failed), 0010 ($P_2'$ parity check failed) or 0001 ($P_1'$ parity check failed). These will produce 0 outputs on decoder lines "8", "4", "2" and "1" respectively.

If two out of four parity check bits are correct then the input to the decoder will be 1100 ($P_4'$ and $P_3'$ failed), 1010 ($P_4'$ and $P_2'$ failed), 1001, 0110, 0101, or 0011. These correspond to the unused "12", "10", "9", "6", "5" and "3" output lines of the decoder.

If only one out of four parity check bits is correct then the input, to the decoder, will be 0111 ($P_4'$ alone correct), 1011 ($P_3'$ alone correct), 1101 ($P_2'$ alone correct) or 1110 ($P_1'$ alone correct. These correspond respectively to the "7", "11", "13" and "14" output lines of the decoder.

If all four of the parity check bits are incorrect then the input to the decoder will be 1111 corresponding to an output on its unused "15" line.

It should now be recalled that:
$P_1$ was determined by $C_1$, $I_2$, $C_2$
$P_2$ was determined by $I_1$, $I_2$, $C_2$
$P_3$ was determined by $I_1$, $C_1$, $C_2$
$P_4$ was determined by $I_1$, $C_1$, $I_2$
from which it follows;
 i. if the only error is in $I_1'$ then $P_2'$, $P_3'$ $P_4'$ fail
 ii. if the only error is in $I_2'$ then $P_1'$, $P_2'$, $P_4'$ fail
 iii. if the only error is in $C_2'$ then $P_1'$, $P_2'$, $P_3'$ fail
 iv. if the only error is in $C_1'$ then $P_1'$, $P_3'$, $P_4'$ fail.

It will be seen that an error in $I_1'$ alone is characterised by a 0 output on the "14" line of the decoder and a 0 at the output of gate 45. Similarly, an error in $I_2'$ alone is characterised by a 0 output on the "11" line of the decoder and a 0 at the output of gate 43. An error in $C_2'$ alone is characterised by a 0 output on the "7" line and 0 from gate 42, and an error in $C_1'$ alone is characterised by a 0 output on the "13" line and 0 from gate 44.

NAND gate 55 will produce a 0 output in the event that lines "7", "11", "13" and "14" of the decoder 46 are all 1. In the event that any one of the lines is a 0 the NAND gate 55 will produce a 1 output. Thus an error in $I_1'$ alone is characterised by a 1 from NAND gate 55 and a 0 from gate 45. These two outputs in conjunction with the gates 50, 51 and 32 are used to correct the digit $I_1'$. Similarly, gates 49, 51 and 30 are used to correct $C_1'$; gates 48, 51 and 28 are used to correct $I_2'$ and gates 47, 51 and 26 are used to correct $C_2'$. It will be as well to observe here that the circuit corrects not only true single bit errors in $I_1'$, $I_2'$, $C_1'$ and $C_2'$ but also those multiple errors which simulate true single bit errors (any combination of errors which causes three out of four of the outputs of the gates 42, 43, 44, 45 to be 1 will appear to be a single bit error and will be corrected, albeit erroneously, as such).

It will readily be seen that a 0 on the "0" line of the decoder 46 means that no error was detected in the byte which therefore has the rating G as explained earlier. Inverter 52 changes the 0 to a 1 for entry in the register 53 which thus stores a record of bytes rated G.

The case of a single error in the byte has already been shown to result in a 1 output from NAND gate 55.

The presence of a 0 on one of the "1", "2", "4" or "8" lines of the decoder means that one of the parity check bits $P_1'$, $P_2'$, $P_3'$ or $P_4'$ is (or appears to be) in error. This follows from the fact that each I and C bit appears three times in the parity check matrix whereas each P bit appears only once, a failure of one parity check and three successes thus indicates P in error. Since the parity check bits are not of any further direct use no attempt is made to correct them. It will therefore be understood that a 1 at the output of NAND gate 57 indicates a single bit error as did the output of NAND gate 55 but this time in a parity check bit.

The gate 56 has a 1 output if there is (or appears to be) but a single bit in error in the byte. It will be remembered that this corresponds to the rating F given earlier. Gate 54 and inverter 58 are arranged so that register 59 stores a record of bytes which are rated either G or F.

It should be noted that any byte which appears to have more than one error in it (the "3", "5", "6", "9", "10" and "12" lines of the decoder) receives the rating B but is not specially recorded. Any byte corresponding to a 1 in register 53 has the rating G, any byte corresponding to a 1 in register 59 but not in register 53 has the rating F, all other bytes are assumed to have the rating B.

Data leaving element 33 enters either register 60 or register 61. The choice of timing waveforms ensures that register 60 receives the convolutional check bits, register 61 receives the information bits, and that the parity check bits are discarded. It should be noted that the information bit $I_0'$ which is subject of the correction algorithm at any given time is the bit in stage 0 of register 61. Exclusive OR gate 62 is used to perform a correction on $I_0'$ if it is determined necessary and the output of corrected data is taken from terminal 64. The circuitry shown in FIG. 3 provides the implementation of the correction algorithm.

It is the function of the gates 91, 92, 93, 94 to carry out the convolutional code check sums mentioned earlier. Each of the gates 91, 92, 93, 94 is such that it produces 0 output if an even number of 1's are applied to its input, otherwise its output is 1.

Gate 91 carries out the check sum:

$$S_{60} = C_{60}' \oplus \Gamma_{52} \oplus \Gamma_{36} \oplus \Gamma_{20} \oplus \Gamma_0$$

and produces 0 for success and 1 for failure.

Similarly, gate 92 carries out the check sum:

$$S_{40} \oplus S_{56} = C_{40}' \oplus C_{56}' \oplus I_{48}' \oplus I_0' \oplus \Gamma_{-4}$$

gate 93 carries out:

$$S_{24} = C_{24}' \oplus I_{16}' \oplus I_0' \oplus \Gamma_{-16} \oplus \Gamma_{-36}$$

and gate 94 carries out:

$$S_8 = C_8' \oplus I_0' \oplus \Gamma_{-16} \oplus \Gamma_{-32} \oplus \Gamma_{-52}$$

The condition that all four gates 91, 92, 93, 94 produce a 0 output signifies zero error in the bits appearing in the check sums. The condition that all four gates 91, 92, 93, 94 produce a 1 output signifies an error in $I_0'$ alone. The condition that three gates produce a 0 output and the fourth a 1 output signifies that, at most, one of the bits in the check sums is in error.

The first four stages of register 95 are thus loaded with information as to whether or not the four check sum tests have succeeded or failed.

The components 68 to 81, 83, 85 to 88 control the loading of the first four stages of register 90 and have a function which is as follows:

i. for each of the four check sums which provide the inputs to register 95, a logic 1 is entered in the corresponding stage of register 90 if all the information bits (excluding $I_0'$) and convolutional check bits which were used in the formation of that sum occurred in a byte of rating G, that is, the entry of a 1 represents the rating G for a check sum. If no check sum has the rating G then:

ii. for each of the four check sums which provide the inputs to register 95, a logic 1 is entered in the corresponding stage of register 90 if all the information bits (excluding $I_0'$) and convolutional check bits which were used in the formation of that sum occurred in a byte of rating F and G, that is, the entry of a 1 represents the rating F for a check sum.

For example, consider the check sum:

$$S_{60} = C_{60}' \oplus I_{52}' \oplus I_{20}' \oplus I_0'$$

a 1 in stage 30 of register 53 means that the byte containing $C_{60}'$ has the rating G a 1 in stage 26 of register 53 means that the byte containing $I_{52}'$ has the rating G a 1 in stage 18 of register 53 means that the byte containing $I_{36}'$ has the rating G a 1 in stage 10 of register 53 means that the byte containing $I_{20}'$ has the rating G.

It will be seen that these four stages provide the inputs to NAND gate 69 which therefore produces an output 0 if the $C_{60}'$, $I_{52}$, $I_{36}'$ and $I_{20}'$ bytes all have rating G ($I_0'$ not being considered).

Similarly NAND gate 65 produces an output 0 if the $C_{60}'$, if the $I_{52}'$, $I_{36}'$ and $I_{20}'$ bytes all have rating F or G ($I_0'$ not being considered).

Likewise, NAND gate 70 is concerned with G rated $C_{40}'$, $I_{48}'$ and $C_{56}'$ bytes and NAND gate 71 with G rated $I_{16}'$ rated $I_{16}'$ and $C_{24}'$ bytes. NAND gates 66 and 67 respectively are concerned with F or G rating for the same bytes.

Inverter 72 is concerned with G rated $C_8'$ bytes and inverter 68 with F or G rated $C_8'$ bytes.

NAND gate 81 has an output 1 if some or all of the check sums ar made up of G rated bytes and an output 0 if none of the check sums is made up of G rated bytes.

The reader may at this point wonder why the NAND gate 70, for example, has inputs for only the bytes containing $C_{40}'$, $C_{56}'$ and $I_{48}'$ and does not have an input for the byte containing $I_{-4}'$. The answer is that $I_{-4}'$ is a bit for which correction has already been determined and is therefore assumed to have the rating G. The same applies to $I_{-16}'$, $I_{-32}'$, $I_{-36}'$.

It has already been stated that register 95 hold information as to which check sum tests have succeeded. This is not to say that the success of a check sum test *proves* the bits on which it is to be founded to be error free, multiple errors could be present such that the test succeeds fallaciously. It is the purpose of the information in register 90 to indicate the degree of confidence which can be placed on the check sum test. It is important to note in what follows, that the convolutional-code-check-derived data in register 95 is processed not in an absolute or fixed manner but in a manner determined by the parity-check-derived data in register 90.

Nothing has yet been said of the fifth stages of registers 90 and 95. The components 82, 84 and 89 have the following function:

i. in the event that some at least of the check sums have rating G, to enter 1 in the fifth stage of register 90 and 0 in the fifth stage of register 95 if the information bit $I_0'$ occurs in a byte rated G, and ii. in the event that no check sum has rating G, to enter 0 in the fifth stage of register 90 and 1 in the fifth stage of register 95.

A few brief examples will now be given (it should be noted that an expression such as "$S_{24}$ bits all F" is used to mean that the bytes containing the bits making up check sum $S_{24}$ excepting the already corrected bits are rated F):

$S_{60}$ bits all G, $S_{40} + S_{54}$ bits all G, $S_{24}$ bits all G, $S_8$ bit rated G, $I_0$ rated G. Then the outputs of the components are as follows: 65 —0, 66 —0, 67 —0, 68 —0, 69 —0, 70 —0, 71 —0, 72 —0, 81 —1, 83 —0, 73 —0, 77 —0, 74 —0, 78 —0, 75 —0, 79 —0, 76 —0, 80 —0, 82 —0, 84 —1, 85 —1, 86 —1, 87 —1, 88 —1, 89 —1.

Example (ii) $S_{60}$ bits all G, $S_{40} + S_4$ bits some G, some F, $S_{24}$ bits all F, $S_8$ bit rated B, $I_0$ rated F. Then the outputs of the components are as follows: 65 —0, 66 —0, 67 —0, 68 —1, 69 —0, 70 —1, 71 —1, 72 —1, 81 —1, 83 —0, 73 —0, 77 —0, 74 —0, 78 —1, 75 —0, 79 —1, 76 —0, 80 —1, 82 —1, 84 —1, 85 —1, 86 —0, 87 —0, 88 —0, 89 —0.

Example (iii) $S_{60}$ bits all F, $S_{40} + S_{54}$ bits all B, $S_{24}$ bits all F, $S_8$ bit rated F, $I_0$ rated G. Then the outputs of the components are as follows: 65 — 0, 66 — 1, 67 — 0, 68 — 0, 69 — 1, 70 — 1, 71 — 1, 72 — 1, 81 — 0, 83 — 1, 73 — 0, 77 — 0, 74 — 1, 78 — 0, 75 — 0, 79 — 0, 76 — 0, 80 — 0, 82 — 1, 84 — 0, 85 — 1, 86 — 0, 87 — 1, 88 — 1, 89 — 0.

The reader can if he wishes devise further examples to show that the circuit performs the functions stated.

The counter 104 is used to count the number of reliable $1_s'$ in register 95 and counter 105 the number of reliable 0's. A 1 or 0 in register 95 is considered reliable if the corresponding stage of register 90 contains a 1, or expressed alternatively, the contents of register 90 control the counting of the contents of register 95 so that only reliable information is counted.

As registers 90 and 95 are loaded, counters 104, 105 are set to zero. The data in registers 90 and 95 is then read out serially, and the counters operate as follows:

i. if the output of register 90 is a 0, neither counter is clocked.

ii. if the output of register 95 is a 1, a 1 from register 95 clocks counter 104 up by one, and a '0' from register 95 clocks counter 105 up by one.

The bistable element 96 has an output of 0 if both the $I_0$ byte is rated G *and* no check sum has the rating G, otherwise the element has an output of 1. The purpose of the element 96 is to suppress correction if $I_0'$ itself appears more reliable than the data indicating it ought to be corrected.

Components 98, 99, 101, 102 and 103 control the inputs to the counters 104 and 105 to provide the entry of data from register 95 under control of register 90.

Comparator 106 determines which is the greater, the count in counter 104 or the count in counter 105. The comparator produces an output of 1 if the count in counter 104 is the greater and 0 otherwise. The inhibiting function of element 96 is achieved in conjunction with gate 107 and a signal controlling correction is taken from inverter 108. If the output of inverter 108 is a 1, correction is achieved by the gate 62 inverting the bit in stage O ($I_0'$) of register 61 on its transfer to register 63. If the output is a 0 the bit is transferred without inversion.

It will now be seen that the circuitry performs the function of the algorithm given earlier.

The embodiment provides improved burst correcting capability, improvement is uncorrected error rate and greatly improved effectiveness in a very high error density channel compared with a standard type of burst-correcting convolutional code.

It should be noted that the particular first error control code (in this case a parity check on eight-bit bytes), the particular second error control code (in this case a convolutional check code with the parameters described on page eight) and the particular algorithm are examples.

One possible modification of the described algorithm is to introduce into it the additional condition that if exactly one check sum has the rating G, then $I_0'$ is changed if and only if the failed check sums rated F are greater in number than the successful check sums rated F.

What is claimed is:

1. A method of correcting errors in a digital signal, the method comprising the steps of:
   receiving a digital signal comprising information bits, first error control bits corresponding to a first error control code, and second error control bits corresponding to a second error control code,
   decoding the first error control bits to determine the probability of error in the received signal,
   decoding the second error control bits, using the error probability determined from the first error control bits to define a correction algorithm, and correcting the information bits by performing on them the said correction algorithm using the decoded second error control bits.

2. A method as set forth in claim 1, further comprising the step of using said first error control bits to correct the second error control bits and information bits prior to performance of said selected correction algorithm.

3. A method as set forth in claim 1, wherein the step of decoding the second error control bits comprise carrying out a predetermined number of tests, each test utilising selected second error control bits and indicating whether or not correction for a particular information bit is required, the step of defining the correction algorithm comprises determining a reliability rating for each test using the error probability determined from the error control bits, and the step of correcting the information bits comprises using the algorithm to determine from the tests whether or not to correct the particular information bit.

4. A method as set forth in claim 3, further including dividing the received signal into bytes, and wherein the step of decoding said first error control bits comprises determining a respective error probability for each byte, and the reliability rating for each test is determined from the error probability ratings of the bytes in which second error control bits used in the test appear.

5. A method as set forth in claim 3, wherein said second error control code is a convolutional check code and the tests are convolutional code check sums.

6. A method as set forth in claim 5, wherein said first error control code is a parity check code.

7. A method as set forth in claim 4, wherein the error probability rating for a byte can be good, fair or bad, where the rating good is given to an error free byte, the rating fair is given to a byte containing exactly one bit in error, and the rating bad is given to a byte containing two or more bits in error.

8. A method as set forth in claim 7, wherein the reliability rating for a test can be good, fair or bad, where the rating good is given to a test the second error control bits of which all appear in bytes rated good, the rating fair is given to a test the second error control bits of which all appear in bytes rated good or fair but not all good, and the rating bad is given to all other tests.

9. A method as set forth in claim 3, wherein the correction algorithm includes determining whether there are more indications that a particular information bit is incorrect than there are that it is correct, the step of defining the correction algorithm comprising selecting the tests for use as indications according to their reliability ratings.

10. Apparatus for correcting errors in a digital signal, the apparatus comprising:
input means to receive a digital signal comprising information bits, first error control bits corresponding to a first error control code, and second error control bits corresponding to a second error control code,
first decoding means connected to the input means to decode the first error control bits to determine the probability of error in the received signal,
second decoding means connected to the input means to decode the second error control bits,
algorithm — defining means connected to the output of the first decoding means to define a correction algorithm using the error probability determined from the first error control bits, and
correction means connected to the algorithm-defining means, the second decoding means and the input means to correct the information bits by performing on them the said correction algorithm using the decoded second error control bits.

11. Apparatus as set forth in claim 10, further comprising additional correction means having an input connected to the input means, the first decoding means, and the second decoding means and an output connected to the first-mentioned correction means and operative to correct said second error control bits and said information bits using said first error control bits.

12. Apparatus as set forth in claim 10, wherein said input means comprises byte-defining means to divide the received signal into bytes.

13. Apparatus as set forth in claim 10, wherein said first decoding means comprises parity check means to carry out a parity check on the first error control bits.

14. Apparatus as set forth in claim 10, wherein said second decoding means comprises convolutional code check means to carry out convolutional code check sums on the second error control bits.

15. Apparatus as claimed in claim 13, wherein said parity check means comprises shift register means and logic gate means connected to selected stages of said shift register means.

16. Apparatus as claimed in claim 14, wherein said convolutional code check means comprises shift register means and logic gate means connected to selected stages of said shift register means.

17. A data transmission system comprising in combination
a. a transmitter including encoding apparatus for coding a digital signal for error correction on reception comprising:
transmitter input means to receive information bits to be trasmitted,
first error control bit inserting means connected to said transmitter input means to add to the information bits first error control bits corresponding to a first error control code and decodable on reception to determine the probability of error in the received signal,
second error control bit inserting means connected to said transmitter input means to add to the information bits second error control bits corresponding to a second error control code and decodable on reception so that a correction algorithm defined in accordance with the error probability determined from the first error control bits can be performed on the information bits using the decoded second error control bits, and
output means connected to the outputs of the first and second error control bit inserting means, and
b. a receiver including correcting apparatus for correcting errors in the coded digital signal, the correcting apparatus comprising:
signal input means connected to receive the coded digital signal
first decoding means connected to the signal input means to decode the first error control bits to determine the probability of error in the received signal, second decoding means connected to the signal input means to decode the second error control bits, algorithm-defining means connected to the output of the first decoding means to define a correction algorithm using the error probability determined from the first error control bits, and correction means connected to the algorithm-defining means, the second decoding means and the input means to correct the information bits by performing on them the said correction algorithm using the decoded second error control bits.

18. A system as set forth in claim 17, wherein said first error control bit inserting means comprises parity check coding means.

19. A system as set forth in claim 17, wherein said second error control bit inserting means comprises convolutional check coding means.

20. Apparatus as set forth in claim 17, further comprising additional correction means having an input connected to the input means, the first decoding means, and the second decoding means and an output connected to the first-mentioned correction means and operative to correct said second error control bits and said information bits using said first error control bits.

21. Apparatus as set forth in claim 17, wherein said input means comprises byte-defining means to divide the received signal into bytes.

22. Apparatus as set forth in claim 17, wherein said first decoding means comprises parity check means to carry out a parity check on the first error control bits.

23. Apparatus as set forth in claim 17, wherein said second decoding means comprises convolutional code check means to carry out convolutional code check sums on the second error control bits.

24. Apparatus as claimed in claim 23, wherein said parity check means comprises shift register means and logic gate means connected to selected stages of said shift register means.

25. Apparatus as claimed in claim 24, wherein said convolutional code check means comprises shift register means and logic gate means connected to selected stages of said shift register means.

* * * * *